Nov. 8, 1932.  J. GOOD  1,887,262
ENGINE OILING SYSTEM
Filed April 10, 1925
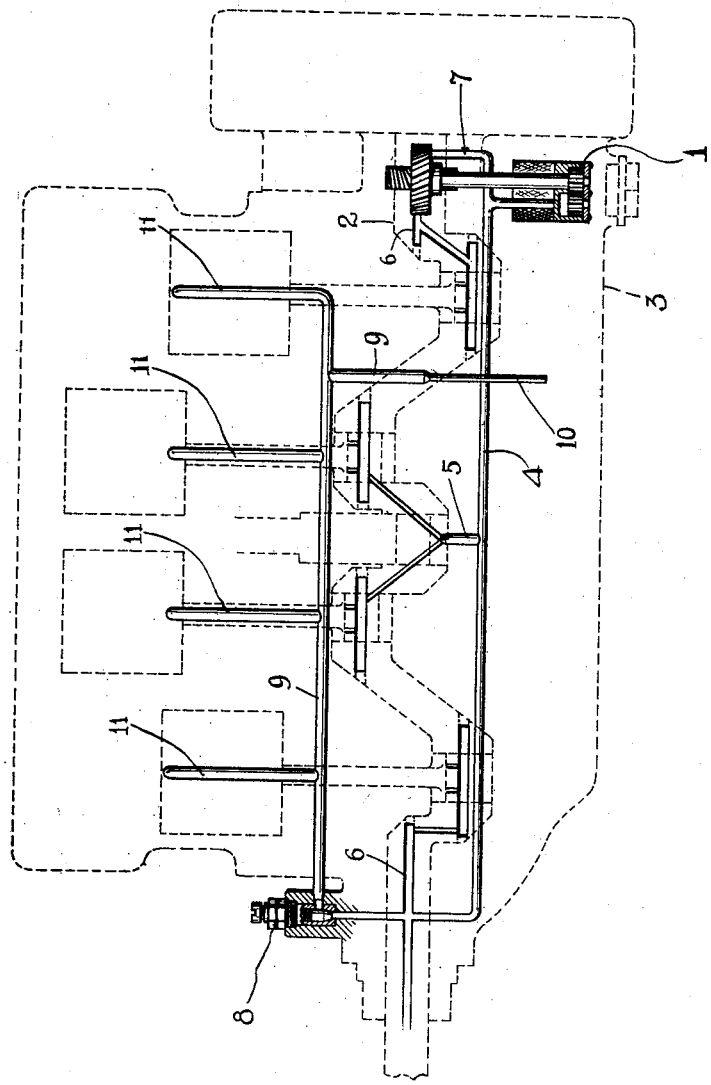
INVENTOR
BY
ATTORNEY Patented Nov. 8, 1932

1,887,262

UNITED STATES PATENT OFFICE

JOHN GOOD, OF GARDEN CITY, NEW YORK, ASSIGNOR TO GOOD INVENTIONS CO., OF NEW YORK, N. Y., A CORPORATION OF NEW YORK

ENGINE OILING SYSTEM

Application filed April 10, 1925. Serial No. 22,110.

The improvement consists in means for establishing a temporary condition of special lubrication for the cylinders or other parts of an automotive engine, which temporary condition substantially coincides with the period in which the engine is warming up after starting and is produced by the viscosity of the oil itself, while it is cold and viscous, and lasts only as long as the oil remains in that condition, such means being entirely automatic in action and not requiring additional moving parts.

During the starting and warming up of an engine the ordinary circulating oil system delivers little or no oil to the wearing surfaces, particularly the cylinders, because the oil is cold and thick, and if the engine is being started after a period of rest, the oil film which was left on the cylinder walls, from previous operation, is apt to be thin or hardened and quite ineffective as a lubricant, so that excessive wear occurs at such times, the wear being greater in proportion to the coldness of the engine and being generally aggravated by racing the engine at such times to get it warm. This condition is eliminated by this invention, according to which an abundant supply of oil is automatically delivered to the principal wear surfaces, e. g. the cylinders, so long as the oil is cold and such oil, notwithstanding its condition, suffices, by reason of its copious delivery, to prevent the wear referred to and at the same time materially relieves the load on the cranking motor in cold weather. This new effect is produced simply by interposing a small bore passage or equivalent restriction at an appropriate point in the normal oil circuit, so that the back pressure resulting from the resistance such passage offers to thick oil will be available for compelling the oil to flow to the cylinders or other wear surfaces through the normal conduits or through auxiliary conduits specially provided for that purpose. When the oil warms up and thereby acquires its normal degree of fluidity, the resistance and back pressure produced by the restriction become negligible and without effect on the normal distribution.

An illustrative example of the invention is shown in the accompanying drawing which diagrammatically represents an automotive engine having the present invention applied to its oil system which is otherwise of conventional type.

The system comprises an oil pump 1 driven from the engine, for example from the crank shaft 2, and drawing its oil from the lower part of the crank case 3, and delivering such oil through a manifold 4 and branches 5, 6, 7, etc. to the various surfaces requiring lubrication. One of these passages 5, is indicated as leading to the center bearing of the crank shaft and through the latter and the oil ducts in the shaft itself to the adjacent crank pins according to the usual design. The branch 6 runs in like manner to the forward crank pin, and the branch 7 to the rear crank pin. In some systems the oil is conducted from the crank pin bearings through the connecting rods to the piston pins and cylinders, and in other systems the pistons and cylinders depend for lubrication on the splash of the crank arms in the oil in the crank case. The system diagrammatically represented in the drawing may be assumed to be the latter type, although this invention can be applied to the other types as well.

All the branches from the main oil manifold 4 have their outlets in the spaces or crevices between the relatively moving surfaces of the lubricated parts and at all times offer a considerable resistance to the flow of oil, so that normally some pressure is necessary in the manifold 4, in order to cause the oil to pass into such spaces at a proper rate. This pressure is produced by the pump and maintained constant by a spring-loaded overflow valve 8 the spring of which can be adjusted according to requirements. The valve provides an escape for the oil delivered by the pump which does not go to the wear surfaces above referred to; such excess oil lifts and passes the valve and flows through a branch passage or duct 9 back to the crank case. In ordinary systems when the engine is cold and the oil viscous, the flow resistance of the branch passages 5, 6, 7, etc. is so great that practically all of the oil flows back to the sump by way of this overflow valve 8 and return passage 9, but in the present case the return passage is provided with a restriction to such return flow, represented by the small bore section 10, and this restriction is predetermined so that to the thick oil it offers considerable resistance but to the thin oil practically none, with the result that during the cold period, nearly the whole delivery from the pump is forced to go through the branch passages to the wear surfaces. After the engine is warm and the oil thin, the back pressure drops and the oil flows freely by gravity to the crank case and only the normal working supply reaches the wear surfaces. In order to insure that the cylinders shall receive ample lubrication during the cold period special oil ducts 11 are provided between the return duct 9 and the engine cylinders, one for each cylinder. These ducts are desirably of relatively large bore so as to offer small frictional resistance to the viscous oil.

It will be apparent that the restriction may be provided in any suitable way and that it may be added to existing systems in various ways, as by fixing a nipple to the end of the return duct, or by partially plugging it or otherwise. In ordinary cases a pipe or tube section about one-eighth inch internal diameter and five or six inches long suffices very well.

The general principal of controlling the function of engine mechanism broadly by and in accordance with viscosity of the lubricating oil is not herein claimed as that forms the subject of a prior application, Serial No. 398,192, filed July 22, 1920.

I claim:

1. In an engine lubricating system, the combination with the oil pump, oil circuit and overflow valve, of a restriction opposing the return flow of the oil from said valve to the pump, said restriction being pre-determined to produce an excessive back pressure on the system and a corresponding oil delivery to the wear surfaces when the oil is cold and viscous, and a negligible back pressure when the oil is warm.

2. The lubricating system defined by claim 1 in which a special passage is provided, active only during the period of said excessive back pressure, for delivering oil to the engine.

3. In an engine lubricating system, the combination of an engine crank case, a pump adapted to withdraw oil therefrom, an oil line fed thereby, a valve in said line normally determining the back pressure therein, a plurality of outlets to the wear surfaces intermediate the pump and valve, and a restriction in said line, on the side of the outlets remote from the pump, predetermined to produce an excessive back pressure on the system and a corresponding delivery through said outlets when the oil is cold and viscous and a negligible back pressure when the oil is warm.

In testimony whereof, I have signed this specification.

JOHN GOOD.